June 16, 1953 M. M. LEVY 2,642,497

MULTICHANNEL PULSE SIGNALING SYSTEM

Filed Nov. 18, 1950 2 Sheets-Sheet 1

INVENTOR
Maurice Moise Levy
BY
[signature]
ATTORNEY

INVENTOR
Maurice Moise Levy
BY
[signature]
ATTORNEY

Patented June 16, 1953

2,642,497

UNITED STATES PATENT OFFICE 2,642,497

MULTICHANNEL PULSE SIGNALING SYSTEM

Maurice Moïse Levy, Ottawa, Ontario, Canada, assignor to The General Electric Company Limited, London, England Application November 18, 1950, Serial No. 196,454
In Great Britain November 21, 1949

3 Claims. (Cl. 179—15)

Figure 1:
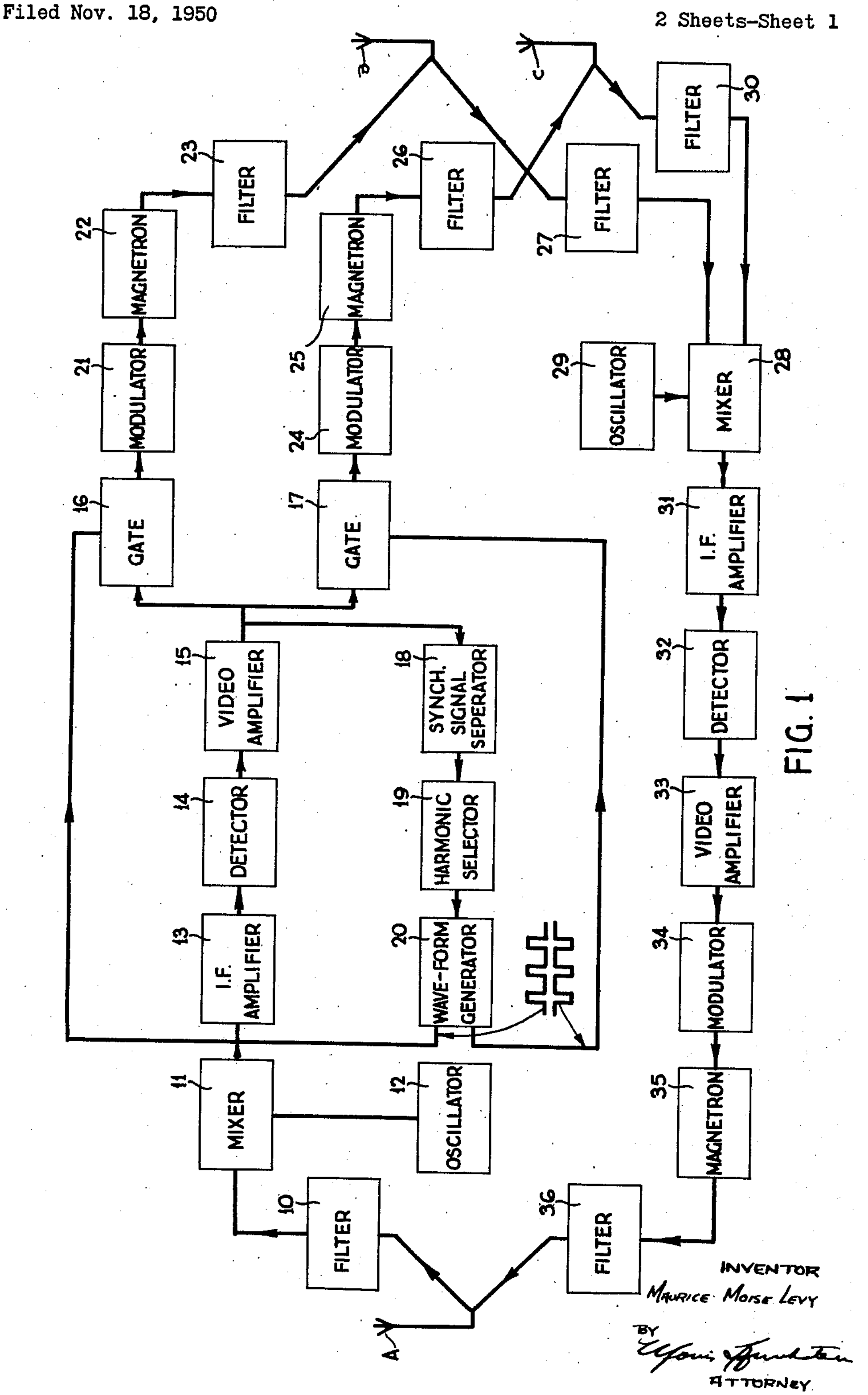

This invention relates to multi-channel pulse signalling systems of the type in which the intelligence of each channel is conveyed by pulses occurring in recurrent time intervals (hereinafter referred to as channel intervals), the channel intervals of different channels being interlaced with one another in time.

The invention is thus concerned with pulse systems using a time-sharing multiplex signal and the pulses may be modulated in any desired manner with the intelligence, for example time (phase) modulation or pulse code modulation may be used. Where pulse time modulation is used, the signal of each channel is transmitted as a train of pulses in which the time position of a pulse, or pair of pulses, in regularly recurrent channel intervals, periodically represents the instantaneous amplitude of the signal. In the case of pulse code modulation each signal to be transmitted is periodically sampled and the amplitude of the sample represented by a group of pulse intervals in each of which there may or may not be a pulse depending on the particular amplitude, the pulse intervals which defined one sample forming a single channel interval.

In certain signalling systems of the type referred to, such for example as radio links, it is required, for instance at a repeater station, to drop one or more channels. That is to say, it is required to extract from the multiplex signal the intelligence in respect of the dropped channel or channels. It has been proposed to extract the pulse signal in respect of a single channel from a multi-channel pulse signal but if a larger number of channels are to be separately extracted from the multiplex signal a very large amount of equipment is required.

The present invention has for its principal object to provide relatively simple means whereby such dropping of channels can be effected.

In two-way signalling systems of the type referred to, the present invention has for its further object to provide relatively simple means whereby channels originating at different transmitting stations can be combined in interlaced relation with one another.

According to the present invention, in a multichannel pulse signalling system of the type referred to, there is provided an arrangement for dropping $(n-r)$ channels from a group of $n$ received interlaced channels, where $n/r$ is an integer, which arrangement comprises means for selecting a synchronising signal from the received signal, means for applying the synchronising signal to generate pulses having a recurrence frequency which is $r$ times the channel recurrence frequency, of substantially rectangular waveform, and each having a duration equal to approximately one channel interval, and a gating device to which the pulses are applied as a gating signal to permit to pass through the gating device only the pulse signal in respect of the $r$ channels to be retained.

The arrangement may also comprise a second gating device, to which a gating signal having a waveform which is the inverse of that of the previously mentioned gating signal, is arranged to pass the pulse signal in respect of the dropped channels. This pulse signal may be demodulated to provide the intelligence of the dropped channels or may be fed to another station. Phase-shifting means may be provided so as to vary the phase of the gating signals and thereby to select the channels which are to be dropped.

According to a feature of the invention, a two-way multi-channel pulse signalling system of the type specified includes a repeater station which is adapted to transmit and receive main multiplex signals carrying the intelligence of a group of channels to and from a station A′ and to transmit and receive component multiplex signals to and from other stations B′, C′ etc., the component multiplex signals transmitted to and received from each of the said other stations B′, C′ etc. carrying the intelligence of a plurality of the channels of said group and there are provided at each of the stations B′, C′ etc. means for using synchronising signals received from the repeater station to synchronise in frequency the component multiplex signals transmitted from the station B′, C′ etc. to the repeater station. Phase shifting means may be provided when necessary either at the other stations B′, C′ etc. or at the repeater station for adjusting the relative phases of the channel intervals in order to secure correct interlacing of the component multiplex signals received by the repeater station to produce the main multiplex signal transmitted by that station.

Figure 2:
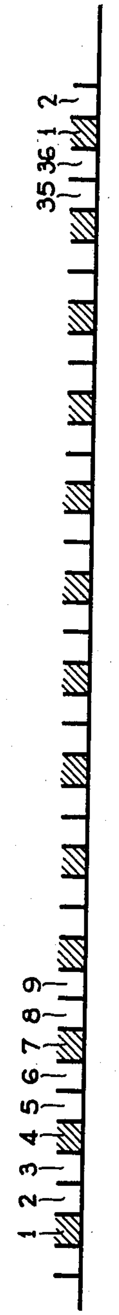
Figure 3:
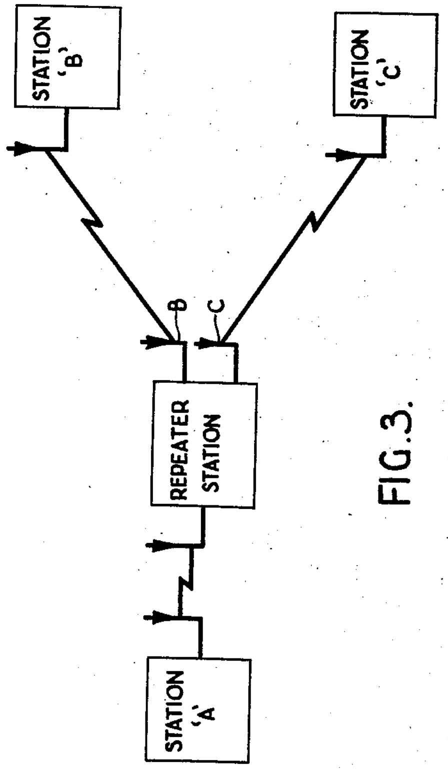

One arrangement in accordance with the present invention will now be described by way of example with reference to the three figures of the accompanying drawing in which:

Figure 1 shows diagrammatically the layout of a radio repeater station in a 36 channel signalling system which utilises pulse time modulation, Figure 2 shows the timing of the channel intervals in the multiplex signals transmitted and received by the repeater station of Figure 1, and Figure 3 shows diagrammatically the complete signalling system including the repeater station of Figure 1.

In the arrangement to be described, the radio repeater station is adapted to transmit and receive in a first direction time multiplex signals in respect of 36 channels, to transmit and receive time multiplex signals in a second direction in respect of 24 channels and to transmit and receive the remaining 12 channels as time multiplex signals in a third direction, the 36 channels being made up of the said 12 and 24 channels.

The same aerial is used in known manner for transmitting and receiving in each direction with the aid of what is known as a common T and R switch which will not be further mentioned. The carrier frequency employed for reception is 4,100 mc./s., and for transmission 4,000 mc./s.

Referring now to Figure 1 which shows the repeater station, the aerial for dealing with the 36 channels is shown as the aerial A, that dealing with the 12 channels is shown as the aerial B, and that dealing with the 24 channels is shown as the aerial C.

The aerial A is coupled through a band-pass filter 10 passing a narrow band of frequencies in the neighbourhood of 4,100 mc./s. to a mixer 11 associated with a local oscillator 12. The output of the mixer 11 is passed to an intermediate frequency amplifier 13 and the output of the intermediate frequency amplifier 13 is fed through a detector 14 and a video frequency amplifier 15. The output of the video frequency amplifier 15 is fed in parallel to two gating devices 16 and 17, each of which may for example comprise a pentode valve (not shown), the signal to be gated being applied to the control grid of this valve and gating signals to be described later being applied to the suppressor grid. The output of the video amplifier 15 is also fed to a synchronising signal selector 18 which selects the synchronising signal from this output. This synchronising signal may be transmitted over one of the channels and consist of a single pulse, of greater amplitude than the remaining channel pulses, in each of the appropriate channel intervals. This pulse signal thus includes a range of harmonics of the pulse recurrence frequency and is applied to a device 19 for selecting from the synchronising signal sinusoidal oscillations having a frequency equal to the twelfth harmonic of the recurrence frequency of the synchronising signal. Alternatively the synchronising signal may consist of two pulses spaced a predetermined time apart in each channel interval of the synchronising channel whereas all the other channel intervals have only one pulse. In that case the synchronising signal separator 18 may comprise a thermionic valve, to the control grid of which is fed the time multiplex signal consisting of positive-going pulses from the amplifier 15. A resistance is connected in the anode circuit of this valve and the voltage developed across the resistance supplied to the input of an open-circuited delay line. Thus a pulse is fed to the delay line on the occurrence of each received pulse and, as the line is open-circuited is reflected back to the input. Pulses developed across the resistance are also fed through a condenser to a further resistance and the resulting pulse signal produced across the further resistance is applied to a diode rectifier. This diode valve is connected with its cathode to the junction of the condenser and further resistance and its anode through a load resistance, part of which may be shunted by a condenser, to a source of positive voltage. The arrangement is such that, on the normal occurrence of a pulse, the voltage across the further resistance is insufficient to cause the diode valve to conduct but the delay line is of such length that the first pulse in a synchronising channel interval is reflected back to the input at the instance of the second pulse and the resulting increased amplitude causes the diode valve to conduct. The synchronising signal is thus produced across the load resistance of the diode valve and is fed to the device 19.

The sinusoidal oscillations from the device 19 are supplied to the waveform generator 20 and converted into oscillations of rectangular waveform, it being arranged that the waveform is one in which the positive-going portions have half the duration of the negative-going portions. This wave is applied as a gating signal to the gating device 16, that is to say in the example given it is fed to the suppressor grid of the pentode valve. The same waveform, but of reversed sense, is applied to the suppressor grid of the second pentode in the other gating device 17. Phase-adjusting means (not shown) may be provided between the synchronising signal separator 18 and the waveform generator 20 to adjust the phase of the gating wave so that it is correctly timed to enable the gating devices 16 and 17 to be open during the appropriate channel intervals.

Figure 2 shows the occurrence of the channel intervals in the multiplex signal received by the aerial A, the channels being numbered from 1 to 36. The channel intervals of those channels which are to be fed as a multiplex signal to the aerial B are shown shaded whereas the remainder are supplied as a multiplex signal to the aerial C.

It will be seen that if the phase of the gating wave is suitably adjusted, there may be selected, as shown in Figure 2, by the gating device 16 channels 1, 4, 7, etc. and by the gating device 17 channels 2 and 3, 5 and 6, 8 and 9 etc. By changing the adjustment of the said phase-adjusting means the particular channel intervals passed by each gating device 16 and 17 can be selected.

The component multiplex signal from the gating device 16 is applied to a modulator 21 and thence to a magnetron 22 adjusted to oscillate at 4,000 mc./s. The output of the magnetron 22 is applied through a band-pass filter 23 passing a narrow band of frequencies in the neighbourhood of 4,000 mc./s. to the aerial B. The component multiplex signal from the gating device 17 is applied through a modulator 24 to another magnetron 25 which also operates at 4,000 mc./s. and the output from the magnetron 25 is fed through a band-pass filter 26 passing a narrow band of frequencies in the neighbourhood of 4,000 mc./s. to the aerial C.

Signals received by the aerial B pass through a band-pass filter 27 selective to the frequency 4,100 mc./s. to a mixer 28 which is also supplied from a local oscillator 29. Similarly signals received by the aerial C are applied through a further band-pass filter 30 selective to the frequency 4,100 mc./s. to the mixer 28 or to a separate mixer. The output of this mixer 28, or the combined output of the two mixers if the signals received by the aerials B and C are fed to separate mixers, is applied to an intermediate frequency amplifier 31, a detector 32 and a video frequency amplifier 33, the output of which is applied to a modulator 34 and a magnetron 35 operating at 4,000 mc./s. The output of the magnetron is applied through a filter 36 passing a narrow band in the neighbourhood of 4,000 mc./s. to the aerial A.

Each of the modulators 21, 24 and 34 may comprise a thermionic valve to the control grid of which is fed the multiplex signal from the preceding amplifier, which signal consists of positive-going pulses. The primary winding of a step-up transformer is included in the anode circuit of this valve and one terminal of the secondary winding is connected to a source of negative potential, say −1,000 volts, and the other terminal is connected to the cathode of the magnetron while the magnetron anode is earthed. The arrangement is such that the cathode is pulsed negatively when a pulse is fed to the said valve so that a burst of radio frequency oscillations is produced.

If preferred, the use of the two magnetrons 22 and 25 associated with the aerials B and C can be avoided by effecting the separation of the channels at radio frequency. Thus a single magnetron may be modulated by the 36 channels and the output of the magnetron may be applied through a waveguide switch, which is arranged to be operated by the gating waveform referred to, and through band-pass filters to the aerials B and C.

Instead of using only the single mixer 28 to pass signals received by both the aerials B and C, there may be two separate mixers each associated with one of the aerials B and C, the output of these mixers being combined in the intermediate frequency amplifier 31.

For simplicity it has been assumed that two local oscillators 12 and 29 are provided. It is only necessary, however, that one local oscillator should be used for the mixers 11 and 28 provided that the leakage paths through this oscillator is such that cross-talk introduced thereby is kept within permissible limits and that the necessary impedance matching conditions are satisfied.

Referring now to Figure 3, it is necessary to ensure that the channels received by aerials B and C interlace correctly with one another. For this purpose it is arranged that suitable synchronising signals, which are preferably the aforesaid synchronising signals received from the station A′, are transmitted from aerials B and C to the stations which will be referred to as B′ and C′ respectively with which these aerials co-operate. At the stations B′ and C′ there are provided synchronising signal separators, as previously described in connection with the repeater station which are arranged to derive synchronising signals which are used to adjust the recurrence frequency of the pulses transmitted from these stations to correspond exactly with that of the synchronising signals. It is preferable that the phases should be correctly adjusted at the stations B′ and C′ but alternatively the signals received at aerials B and C may be suitably delayed at the repeater station in order to ensure exact interlacing.

It can be shown that in a ground installation, in spite of changes in the path length which may occur due for example to changes in the refractive index of the atmosphere, it is not necessary to vary this phase relation in order to ensure that correct interlacing is maintained. This is because in practical cases the changes in time produced by changes in path length which can occur are sufficiently small to avoid any difficulty through inaccurate interlacing.

I claim:

1. In a multi-channel pulse signalling system of the type in which the intelligence of each channel is conveyed by pulse signals occurring in recurrent channel intervals and in which one channel carries a synchronizing signal, an arrangement for dropping $(n-r)$ channels from a group of $n$ received interlaced channels, where $n/r$ is an integer, said arrangement comprising means for selecting the synchronising signal from the received signal, means for applying the synchronising signal to generate pulses having a recurrence frequency which is $r$ times the channel recurrence frequency, said generated pulses being of substantially rectangular waveform and each having a duration equal to approximately one channel interval, and a gating device to which the generated pulses are applied as a gating signal to permit to pass through the gating device only the pulse signal in respect of the $r$ channels to be retained.

2. An arrangement according to claim 1 wherein a second gating device, to which is applied a gating signal having a waveform which is the inverse of that of the previously mentioned gating signal, is provided to pass the pulse signal in respect of the dropped channels.

3. An arrangement according to claim 1 wherein phase-shifting means are provided so that the phase of the gating signal may be varied.

MAURICE MOÏSE LEVY.

References Cited in the file of this patent

UNITED STATES PATENTS

| Number | Name | Date |
|---|---|---|
| 2,429,613 | Deloraine | Oct. 28, 1947 |
| 2,509,218 | Deloraine | May 30, 1950 |
| 2,537,991 | Grieg | Jan. 16, 1951 |
| 2,547,001 | Grieg | Apr. 3, 1951 |